(12) United States Patent
Bharadwaj et al.

(10) Patent No.: US 11,520,004 B2
(45) Date of Patent: Dec. 6, 2022

(54) SYSTEM AND METHOD FOR GENERATING POINT CLOUD DATA IN A RADAR BASED OBJECT DETECTION

(71) Applicant: Steradian Semiconductors Private Limited, Bengaluru (IN)

(72) Inventors: Sachin Bharadwaj, Bengaluru (IN); Sai Gunaranjan Pelluri, Bengaluru (IN); Sumeer Bhatara, Bengaluru (IN); Apu Sivadas, Bengaluru (IN)

(*) Notice: Subject to any disclaimer, the term of this patent is extended or adjusted under 35 U.S.C. 154(b) by 395 days.

(21) Appl. No.: 16/744,176

(22) Filed: Jan. 16, 2020

(65) Prior Publication Data

US 2021/0141053 A1     May 13, 2021

(51) Int. Cl.
*G01S 7/288*      (2006.01)
*G01S 13/42*     (2006.01)

(52) U.S. Cl.
CPC .............. *G01S 7/288* (2013.01); *G01S 13/42* (2013.01); *G01S 7/2883* (2021.05)

(58) Field of Classification Search
None
See application file for complete search history.

(56) References Cited

U.S. PATENT DOCUMENTS

2017/0033966 A1* 2/2017 Al-Dweik ........... H04L 25/0212

FOREIGN PATENT DOCUMENTS

EP      3690483 A1 *  8/2020

\* cited by examiner

*Primary Examiner* — Whitney Moore

(57) ABSTRACT

According to an aspect, method of enhancing a resolution in a radar system having an antenna aperture comprises measuring a first radiation pattern corresponding to a first set of receiving antennas by feeding a known radio frequency (RF) signal over the first set of receiving antennas, wherein the first set of radiation due to an impairment, coherently combining an interpolated radiation pattern with a received radar signal received by the set of receiving antenna when employed for an object detection, to generate a high signal to noise ratio (SNR) received signal, and iteratively combining the high SNR received signal with the interpolated signal to reduce the error due to the impairment.

6 Claims, 7 Drawing Sheets

SYSTEM AND METHOD FOR GENERATING POINT CLOUD DATA IN A RADAR BASED OBJECT DETECTION

BACKGROUND

Cross References to Related Applications

This application claims priority from Indian patent application No. 201941046016 filed on Nov. 12, 2019 which is incorporated herein in its entirety by reference

Field of Invention

Embodiments of the present disclosure relate to high resolution radar system and in particular relates to a system and method for generating point cloud data in radar based object detection.

Related Art

Radar systems are generally employed for object detection and increasingly used in various automotive applications such as for driver assistance, obstacle detection, avoidance, and navigation of drones/UAVs, for example. As is well known, radars can detect surrounding obstacles or objects and send the relevant information like distance, relative position, and direction and velocity of the object that are in motion to a controller (software or hardware) or to a decision making unit in the automotive device.

In some applications antenna arrays are employed to transmit and receive radar signal. The antenna array enables formation of an RF signal beam both for transmitting and receiving the radar signal. In that, time shifted (phase shifted) radar signals are transmitted/received over the antennas to steer the beam in desired direction as is well known in the art. A two or three dimensional object shape and location is determined by steering the beam over a range/area.

Briefly, FIG. 1A illustrates a conventional technique for determining the range and angle. In that, antenna array 101 transmits and receives the radar signal. In that, antenna array 101 transmits the radar signal provided by the radar transmitter 102. As is well known, the radar transmitter 102 provides phase shifted version of a radar signal to the antenna array to form a beam in a desired direction and the phase angle is adjusted to steer the beam over the desired area. Similarly, the antenna array 101 receives the radar signal reflected from one or more objects and provides the received signal to the radar receiver 103.

The radar receiver 103 may demodulate and perform signal processing like Fast Fourier Transform (FFT) to extract range and Doppler. The range and Doppler is provided to the detector 104 that selects signals with signal-to-Noise ratio (SNR) higher than a preset threshold. The selected signal is provided to the beam former 105 to form beam from the selected signals. The beam provides the angle information. The detector 106 selects the beam that corresponds to local peak. However such conventional radar system lacks resolution to detect objects with more precision.

In particular, when the radar system is employed for imaging (often referred to as imaging radar), a high range as well as a high angle resolution (both azimuth and elevation) is desirable to get the shape and contour of a 3D object. For example, high angle resolution in a radar system enables representing a 3D object with a larger number of points for more precise detection. However, the beam width is limited by the antenna radiation pattern such as main lobe, side lobes etc., as is well known in the art. Some of the conventional techniques employed for detecting more objects (increase angle resolution) are described below for reference.

FIG. 1B illustrates another conventional technique. As shown there correlator 127 and Capon beamformer 128 are additionally employed between the detector 104 and 106. The correlator 127 makes use of the selected signal from detector 104 over multiple frames to determine the covariance. For example, the correlator 127 may perform correlation of the data received from the detector 104 with the data received over prior K frames. The correlated data is provided to the Capon beamformer 128 for generating the beam.

Due to correlation, the side lobes errors are removed to an extent there by increasing the resolution as is well known in the art. However, such conventional technique requires buffering the data over K frames there by increasing the response time, at least. FIG. 1C illustrates yet another conventional technique. In that, the source estimator 137 performs data covariance over K snapshots, find Eigen values for signal and noise subspace, and estimate number of sources. The MUSIC Pseudo spectra beam former 138 performs beam forming employing well known MUSIC algorithm.

As may be appreciated, both conventional techniques of FIGS. 1B and 1C employ multiple snapshots of the received data and hence are referred to as data dependent beam forming. The conventional techniques fail to adequately remove errors due to some impairment in the system, at least.

SUMMARY

According to an aspect, method of enhancing a resolution in a radar system having an antenna aperture comprises measuring a first radiation pattern corresponding to a first set of receiving antennas by feeding a known radio frequency (RF) signal over the first set of receiving antennas, wherein the first set of radiation due to an impairment, coherently combining an interpolated radiation pattern with a received radar signal received by the set of receiving antenna when employed for an object detection, to generate a high signal to noise ratio (SNR) received signal, and iteratively combining the high SNR received signal with the interpolated signal to reduce the error due to the impairment.

According to another aspect the impairment is a set of radiation by the corresponding set of feed lines connecting the first set of receiving antennas to a signal processing electronics (transceiver) in the radar system. Further method comprises, translating the first radiation pattern to the interpolated radiation pattern using at least one of a frequency of operation, bandwidth, and field of view of the radar system when employed for the object detection.

Several aspects are described below, with reference to diagrams. It should be understood that numerous specific details, relationships, and methods are set forth to provide full understanding of the present disclosure. Skilled personnel in the relevant art, however, will readily recognize that the present disclosure can be practiced without one or more of the specific details, or with other methods, etc. In other instances, well-known structures or operations are not shown in detail to avoid obscuring the features of the present disclosure.

DETAILED DESCRIPTION OF THE PREFERRED EXAMPLES

Figure 2:
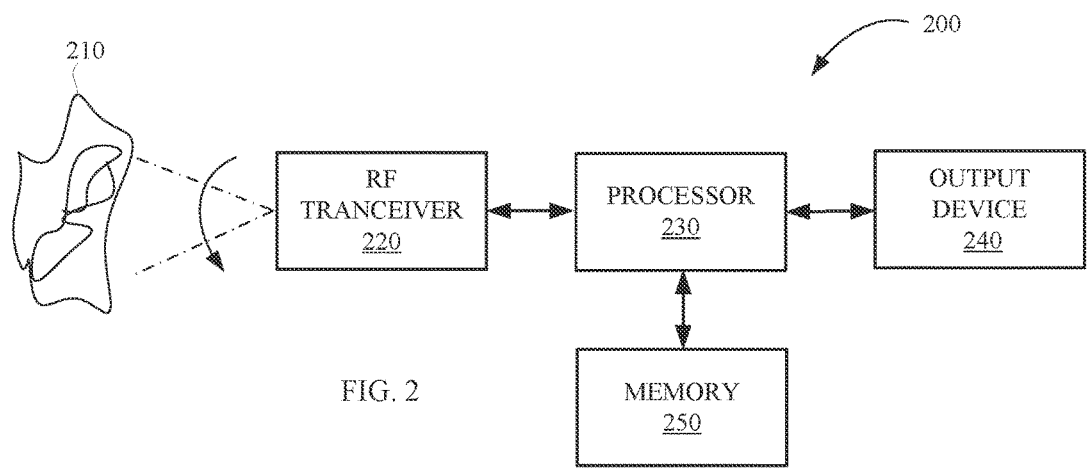
FIG. 2 is a block diagram of an example system 200 (environment) in which various aspects of the present invention may be seen.

FIG. 2 is a block diagram of an example radar system 200 (environment) in which various aspects of the present invention may be seen. The environment is shown comprising objects 210, Radio Frequency (RF) transceiver 220, processor 230, output device 240 and memory 250. Each element in the system 200 is further described below.

RF transceiver 220 transmits a radar (RF) signal over a desired direction(s) and receives a reflected radar signal that is reflected by the object 210. In one embodiment, the RF transceiver 220 may employ multiple (one or more) receiving antennas to receive the reflected RF signal and multiple (one or more) transmitting antenna for transmitting the radar signal. Accordingly, the transceiver 220 may employ these multiple transmitting/receiving antennas in several of multiple input and multiple output (MIMO) configurations to form desired transmitting and receiving RF signal beam (often referred to as Beam forming) to detect objects from the reflected signal. The objects 210 may comprise a terrain, terrain projections, single object, cluster of objects, multiple disconnected objects, stationary object, moving object, live objects etc.

Processor 230 conditions and processes the received reflected RF signal to detect one or more objects (for example 210) and determines one or more properties of the objects. The properties of the object thus determined (like shape, size, relative distance, velocity etc.) are provided to the output device 240. In an embodiment, the processor 230 comprises signal conditioner to perform signal conditioning operations and provides the conditioned RF signal for digital processing. The memory 250 may store RF signal like samples of the reflected RF signal for processing. The processor 230 may temporarily store received data, signal samples, intermediate data, results of mathematical operations, etc., in the memory 250 (such as buffers, registers). In an embodiment, the processor 230 may comprise group of signal processing blocks each performing the specific operations on the received signal and together operative to detect object and its characteristics/properties.

The output device 240 comprises navigation control electronics, display device, decision making electronic circuitry and other controllers respectively for navigation, display and further processing the received details of the object. Accordingly, the system 200 may be deployed as part of unmanned vehicles, driver assistant systems, for obstacle detection, navigation and control, and for terrain mapping.

In an embodiment, the RF transceiver 220, processor 230, and memory 250 are implemented as part of an integrated circuit integrated with other functionality and/or as a single chip integrated circuit with interfaces for external connectivity like the output device 140. The manner in which the transceiver 220 and the processor 230 (together referred to as Radar transceiver) may be implemented in an embodiment is further described below.

Figure 3:
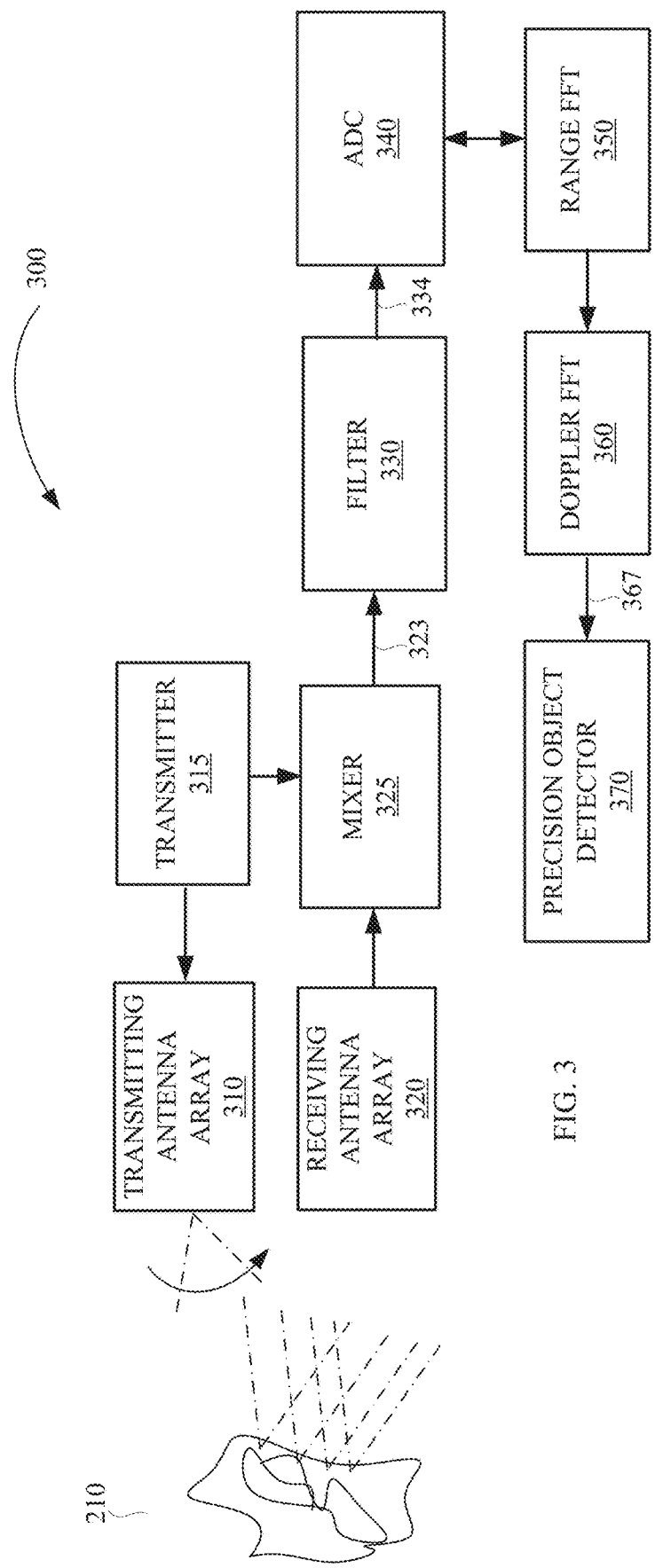
FIG. 3 is an example radar transceiver for object detection and recognition in an embodiment.

FIG. 3 is an example radar transceiver for object detection and recognition in an embodiment. The radar transceiver 300 is shown comprising transmitting antenna 310, transmitter block 315, receiving antenna array 320, mixer 325, filter 330 Analog to digital convertor (ADC) 340, Range FFT 350, Doppler FFT 360 and precision object detector 370. Each element is described in further detail below.

The transmitting antenna array 310 and the transmitter 315 operate in conjunction to transmit RF signal over a desired direction. The transmitter 315 generates a radar signal for transmission and provides the same to the transmitting antenna array 310 for transmission. The transmitting antenna array 310 is employed to form a transmit beam with an antenna aperture to illuminate objects at suitable distance and of suitable size. Various known beam forming techniques may be employed for changing the illuminated region. In one embodiment, the transmitter 215 may generate a radar signal comprising sequence of chirps.

The receiving antenna array 320 comprises antenna elements each element capable of receiving reflected RF signal. The receiving antenna array 320 is employed to form an aperture to detect objects with a desired resolution (for example object of suitable size). The RF signal received on each element corresponding to one transmitted chirp represents one snapshot. The received signal (the sequence of snapshots corresponding to the sequence of chirps transmitted) is provided to the mixer 325.

The Mixer 325 mixes RF signal received on each of M antenna elements with the transmitted chirp (local oscillator frequency) to generate an intermediate frequency signal (IF signal). In that the mixer 325 may comprise M number of complex or real mixers to mix each RF signal received on the corresponding M antenna elements. Alternatively, the mixer 325 may comprise a fewer mixers multiplexed to perform desired operation. The N number of intermediate frequency (IF) signal is provided on path 323 to filter 330. The filter 330 passes the IF signal attenuating the other frequency components (such as various harmonics) received from the mixer. The filter 330 may be implemented as a pass band filter to pass a desired bandwidth (in conjunction with chirp bandwidth BW). The filtered IF signal is provided on path 334 to ADC 340.

The ADC 340 converts IF signal received on path 334 (analog IF signal) to digital IF signals. The ADC 340 may sample the analog IF signal at a sampling frequency Fs and convert each sample value to a bit sequence or binary value. In one embodiment the ADC 340 may generate 256/512/1024 samples per chirp signal. The digitized samples of IF signal (digital IF signal) is provided for further processing.

The Range Fast Fourier transform (FFT) 350, performs P point FFT on the digital IF samples to generate plurality of ranges of the plurality objects 210. For example, range FFT 350 performs FFT on digital IF signal corresponding to each chirp. The Range FFT 350 produces peaks representing the ranges of the objects.

The Doppler FFT 360 performs FFT operation on the ranges across N chirps. The peaks in the Doppler FFT represent the Doppler of the objects or the velocity of the objects. The ranges and Doppler of the objects are provided to the precision object detector 370. The precision object detector 370 detects objects with higher resolution for the RF signal received on the receiving antenna array 320 with resolution corresponding to the antenna aperture. In one embodiment, the precision object detector 370 reduces the error due to impairments in the system 300 and enhances the resolution. Accordingly, example impairment in a radar system is first described below.

Figure 4A:
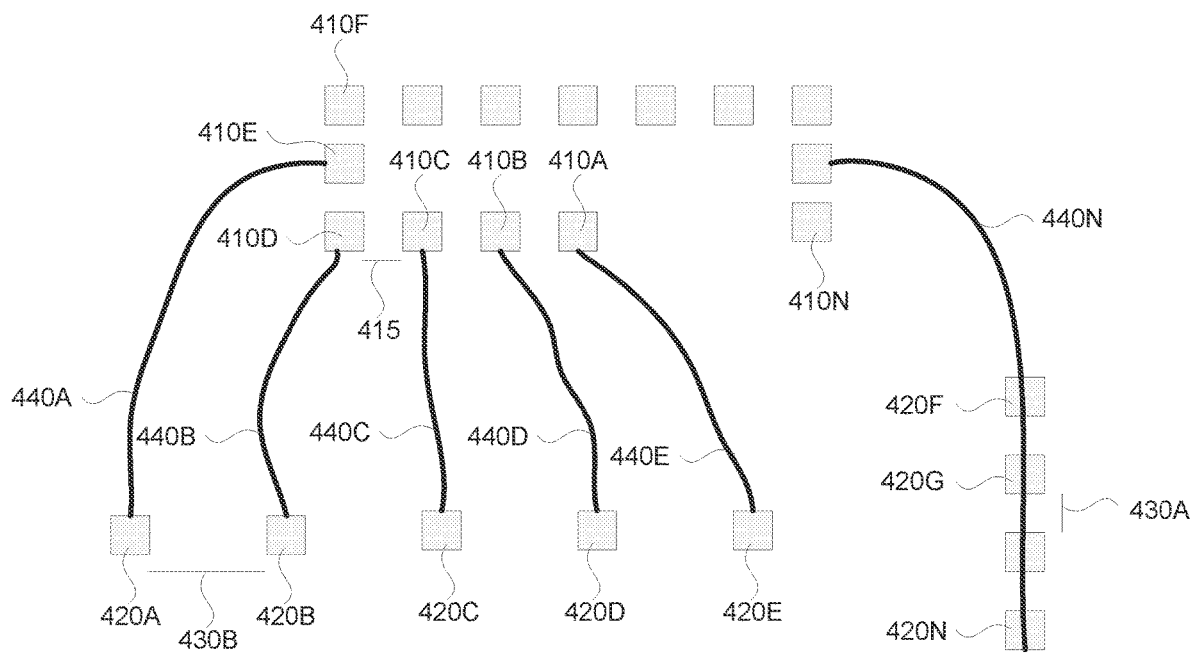
FIG. 4A is a block diagram illustrating example impairment in the radar system.

FIG. 4A is a block diagram illustrating example impairment in the radar system. The block diagram is shown comprising transceiver pins 410A-N, antenna pins 420A-N, antenna pitch 430A and 430B and feed lines 440A-N. Each element is described in further detail below.

The transceiver pins 410 A-N provide means for electrical connectivity between the transceiver and the antenna array. The transceiver pins 410A-N represents the interface point on an integrated circuit or on a device implementing transmitter block/receiver block. The electronics and/or the processing elements to generate radar signal for transmission, in full or in part may be implemented in the transmitter block (for example block 320) so that the radar signal, ready for transmission, (to be radiated over antenna array) are presented on selected transceiver pins 410A-N. Similarly, the electronics and/or the processing elements to receive radar signal that are reflected from the object, in full or in part may be implemented in the receiver block (for example blocks 325, 330, 340, 350 etc.) so that the radar signal, as received, ready over antenna array are presented on selected transceiver pins 330A-N for processing.

The antenna pins 420A-N are the interface points connecting the antenna elements in the antenna array (for example 310). The antenna array elements are arranged in a definite pattern and spacing with a pitch 430A and/or 430B. The pattern and the pitch are often determined based on frequency of RF signal, Radiation pattern and the aperture desired. Accordingly, the antenna array is positioned such that, the signal radiated is towards the space in which the objects are required to be detected. The antenna pitch 430A and 430B may be set to different distance. For example, the antenna elements configured to transmit may be spaced with a pitch 430A and the antenna elements configured to receive the reflected signal may be spaced apart with a pitch 430B.

The feed lines 440A-N are conductive paths electrically connecting the transceiver pins 410A-N with the corresponding ones of antenna pins 420A-N. The pitch of the antenna pins and pitch of the transceiver pins may be different. For example, the pitch 415 of the transceiver pins may be set to 0.5 mm while the pitch of the antenna pin may be set to 2 mm. Further, location and position of the antenna array and transceiver, and other aspects may cause the feed line to bend and curve and have different length. The feed line 440A-N may also radiate signal and cause interference in both transmitted and received RF signal. In particular, at millimeter wave frequencies the feed lines 440A-N radiate and corrupt the radiation behavior of the antenna element in the array 310. This means, the gain and phase response of each antenna will not be identical to each other.

Figure 1A:
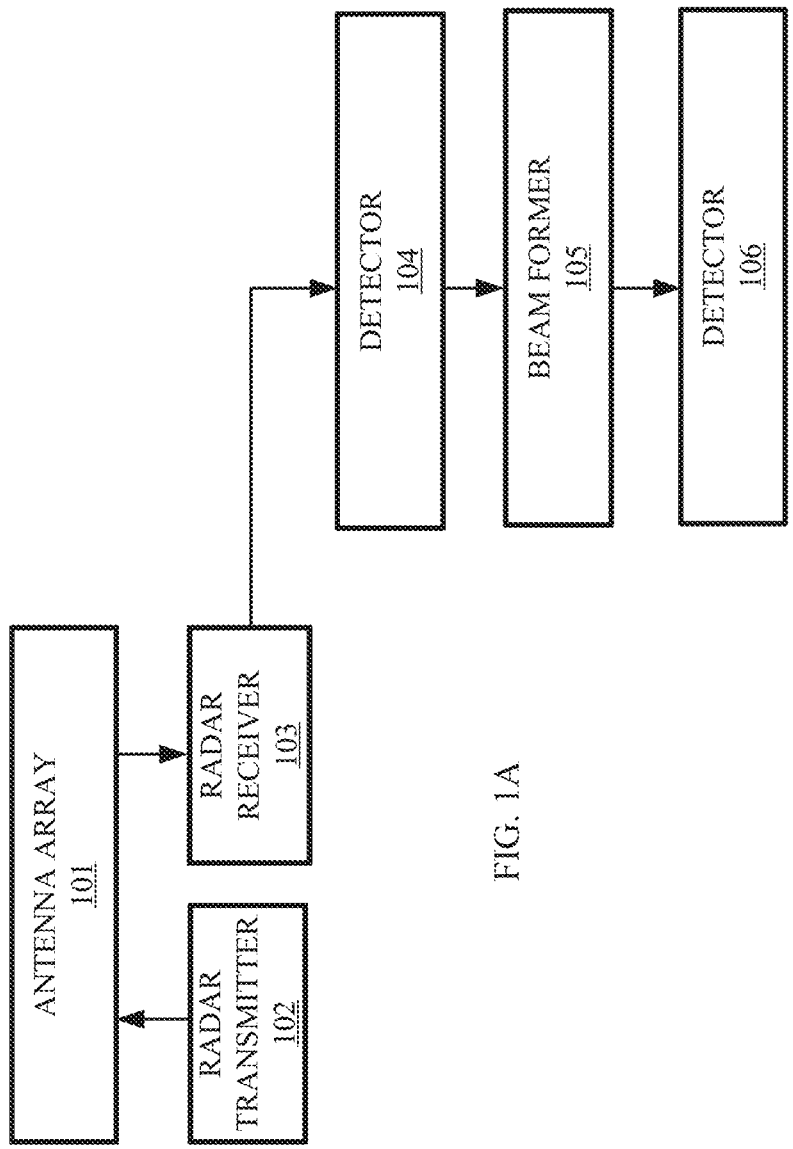
FIG. 1A illustrates one conventional technique for determining the range and angle.
Figure 1C:
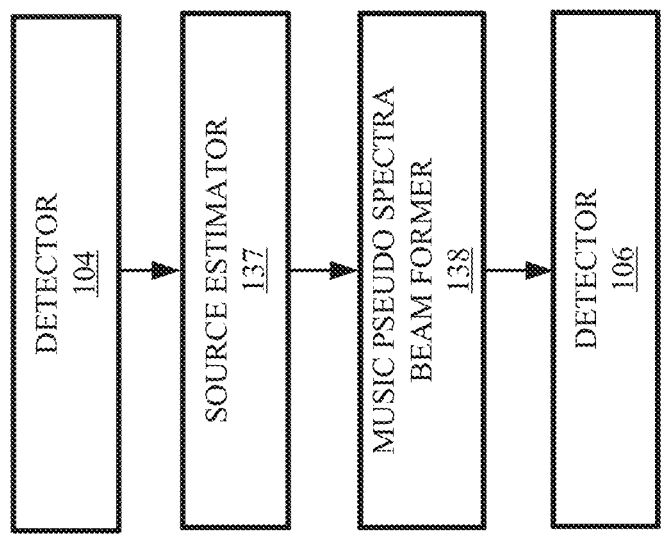
FIG. 1C illustrates yet another conventional technique.
Figure 1B:
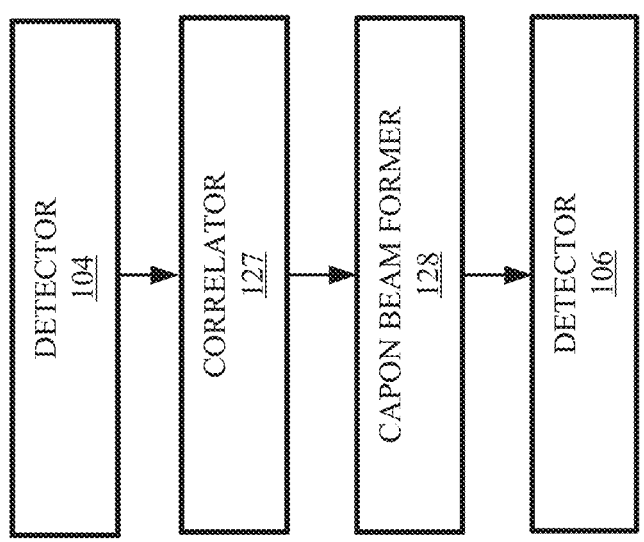
FIG. 1B illustrates another conventional technique.
Figure 4B:
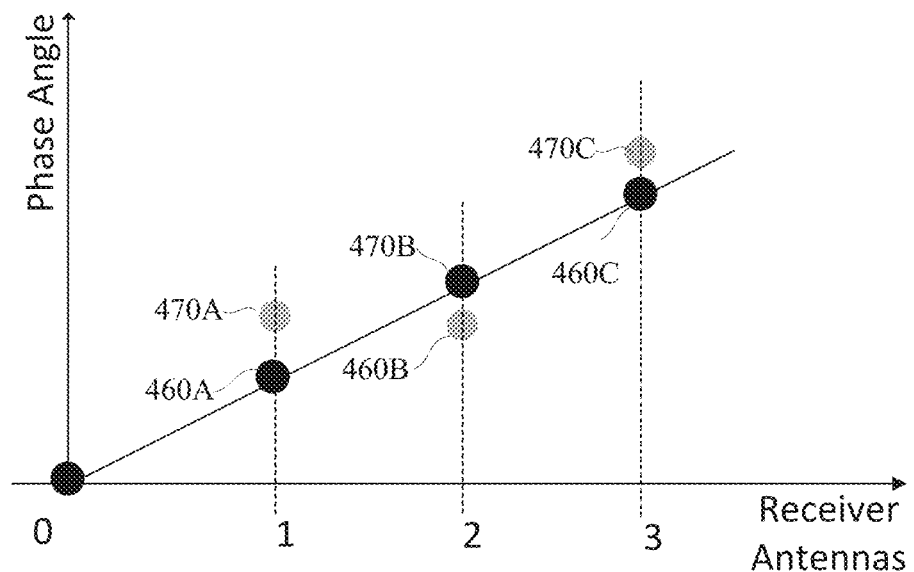
FIG. 4B illustrates an example smear in the phase response due to the radiation from feed lines.
Figure 4C:
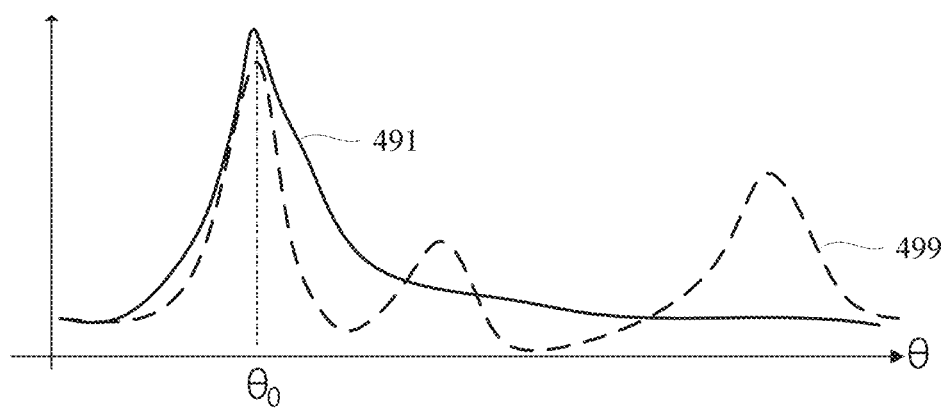
FIG. 4C illustrates an example real target 491 and smear 499 due to the feed line radiation.

As may be appreciated, the convention systems discussed in FIGS. 1A, 1B and 1C, estimate the angle by considering that the phase responses across sensors (antenna) are proportional to the path lengths (treating each antenna element as point source as its geometric centre). When the feed lines are radiating and are not identical, this consideration is violated. For example, in a uniform linear array, the phase response deviates from being ideal linear and hence creates smearing (loss of resolution) & spurious targets. FIG. 4B illustrates an example smear in the phase response due to the radiation from feed lines. FIG. 4B is a graph, in that X-axis represents receiver antenna elements and Y-axis represents the phase angle of the signal radiated. As may be seen, the points 460A-C represent the phase angle of the radar signal received only by antenna elements. The points 470A-C represent the phase angle deviation due to radiation of the feed line. The FIG. 4C illustrates an example real target 491 and smear 499 due to the feed line radiation. In one embodiment, the precision object detector 370 reduces the smear and improves the resolution.

Figure 5A:
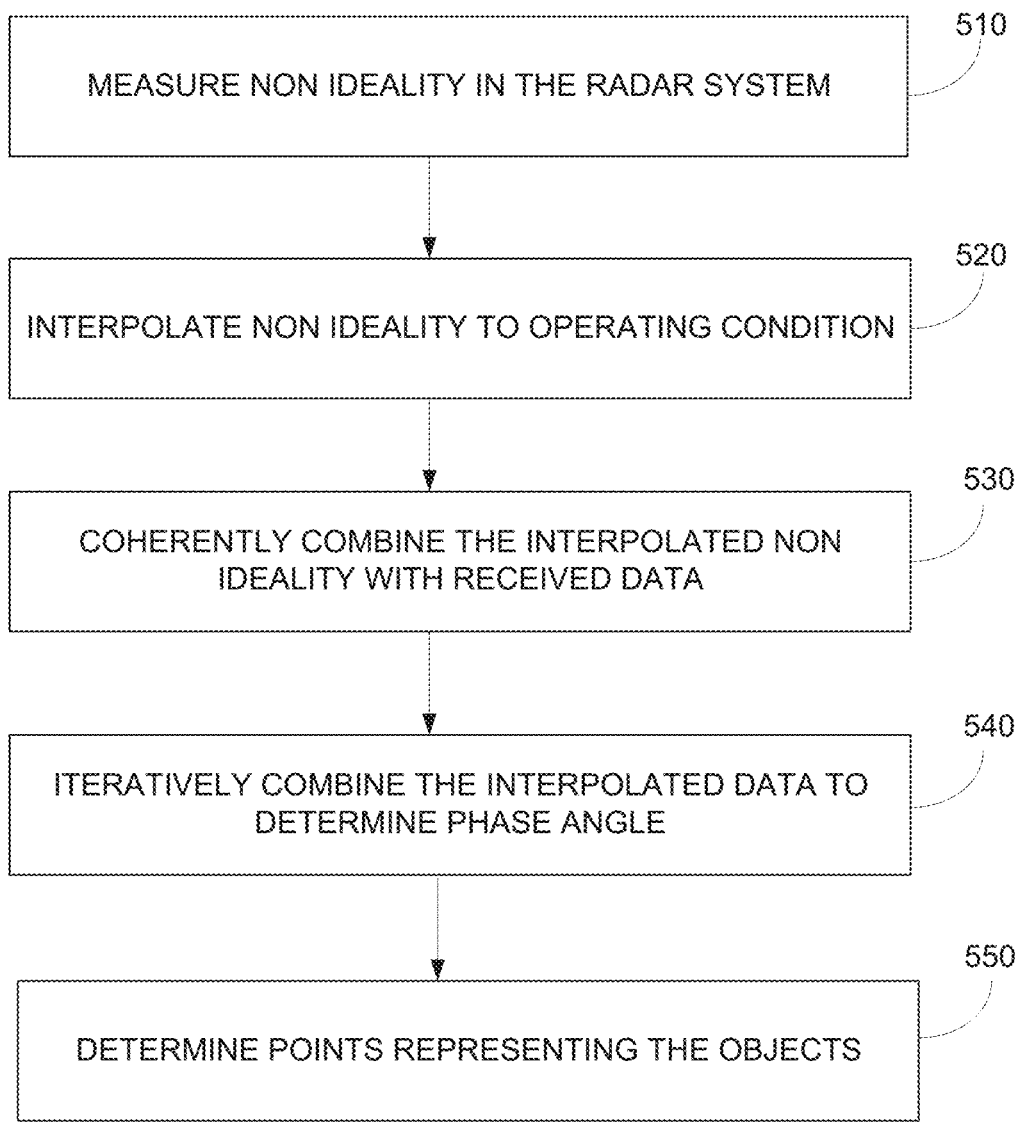
FIG. 5A is a block diagram illustrating the manner in which the resolution of a radar system is improved in an embodiment.

FIG. 5A is a block diagram illustrating the manner in which the resolution of a radar system is improved in an embodiment. In block 510, a non ideality in the radar system is measured. The non ideality in the radar system may comprise a radiation pattern due to feed lines that may be measured by subjecting the radar system 300 to a known signal.

Figure 5B:
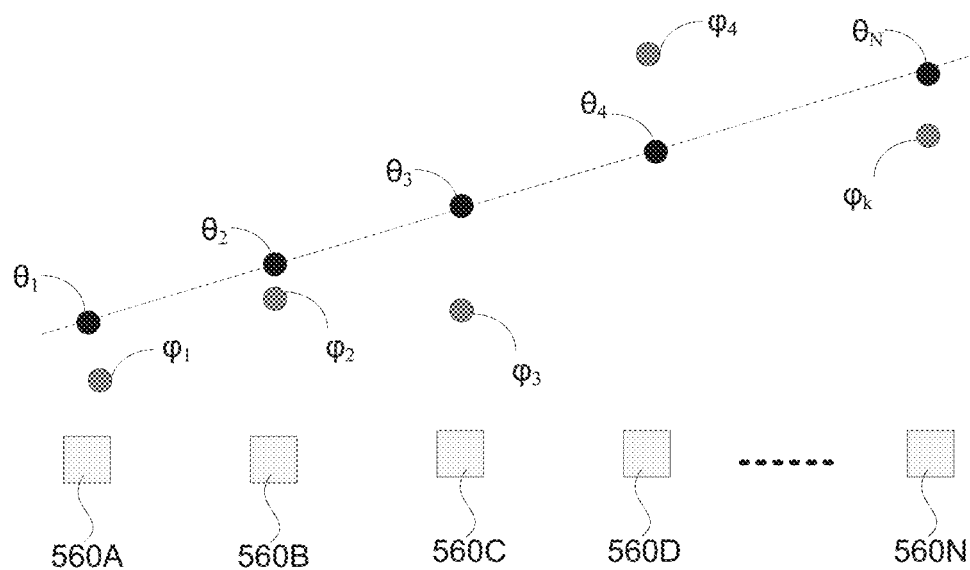
FIG. 5B illustrates an example impairment in the radar system.

FIG. 5B illustrates an example impairment in the radar system. In that, the angles $\theta_1$, $\theta_2$, $\theta_3$, $\theta_N$, represent the primary angles measured across N receiving antenna elements 560A-N in the array respectively. A reference signal with a known phase angle, frequency, and bandwidth for example, may be fed to the antenna elements to measure the primary angles. Accordingly, $\theta_1$, $\theta_2$, $\theta_3$, . . . $\theta_N$, may represent an object at particular angle from the radar antenna array. The angles $\phi_1$, $\phi_2$, $\phi_3$ . . . $\phi_k$ represent the angles measured due to feed lines radiations. These angles $\phi_1$, $\phi_2$, $\phi_3$ . . . $\phi_k$ may result in (represent) a spurious object. Accordingly, for the reference signal, angles $\theta_1$, $\theta_2$, $\theta_3$, . . . $\theta_N$, represent the correct/desired object (primary object) and angles $\phi_1$, $\phi_2$, $\phi_3$ . . . $\phi_k$ represent the impairment (non ideality). These impairments need to be cancelled or corrected for accurate and high resolution object detection.

The measured non ideality may be quantized and/or digitized to store in a memory. In block 520, the measured non ideality is interpolated (interpolated non ideality data) corresponding to the operating conditions like desired resolution, frequency of operation, RF bandwidth, and Field of View (FOV), etc. As may be appreciated, the stored impairments (angles $\phi_1$, $\phi_2$, $\phi_3$ . . . $\phi_k$) correspond to transmission/reception of the reference signal. However, in real time, the radar system may be subjected to transmit and receive signal with different frequency, bandwidth etc. Accordingly, a new set of angles $\psi_1$, $\psi_2$, $\psi_3$ . . . $\psi_k$ (interpolated non ideality data) may be generated through interpolation techniques that corresponds to the operating frequency, bandwidth and FOV, for example.

In block 530, the interpolated non ideality data is coherently combined with the received data to enhance the signal to noise ratio. In block 540, the interpolated non ideality data is iteratively combined to determine the angle of the objects. For example, a sparse signal processing technique may be employed that chooses the direction(s) of the incoming data by iteratively reducing the residual error as a function of incoming data and interpolated non ideality data.

In block 550, the points representing the objects are determined from the angles. For example, objects and its angle may be selected by using one or more technique such as using a relative threshold from the output having maximum strength, by iterating for pre-defined number of iteration(s) and/or by selecting a solution of particular iteration if residual error is smaller than pre-defined threshold.

As a result, the radar system 300 overcomes at least some of the dependency like, dependency on linear phase assumption across MIMO antenna array, dependency on RF start frequency and RF sweep bandwidth. Further, the radar system 200/300 achieves better resolution in angle over data-independent/data-dependent beamforming approaches discussed with reference to FIG. 1A-1C. In the radar system 300, there is no need to estimate number of signal sources a-priori like in sub-space based approaches. Thus, angle is estimated from a single snapshot of the data unlike as in sub-space methods and data-dependent beamformer methods. The manner in which the precision object detector 370 may be implemented employing the stored non-idealities is further described below.

Figure 6:
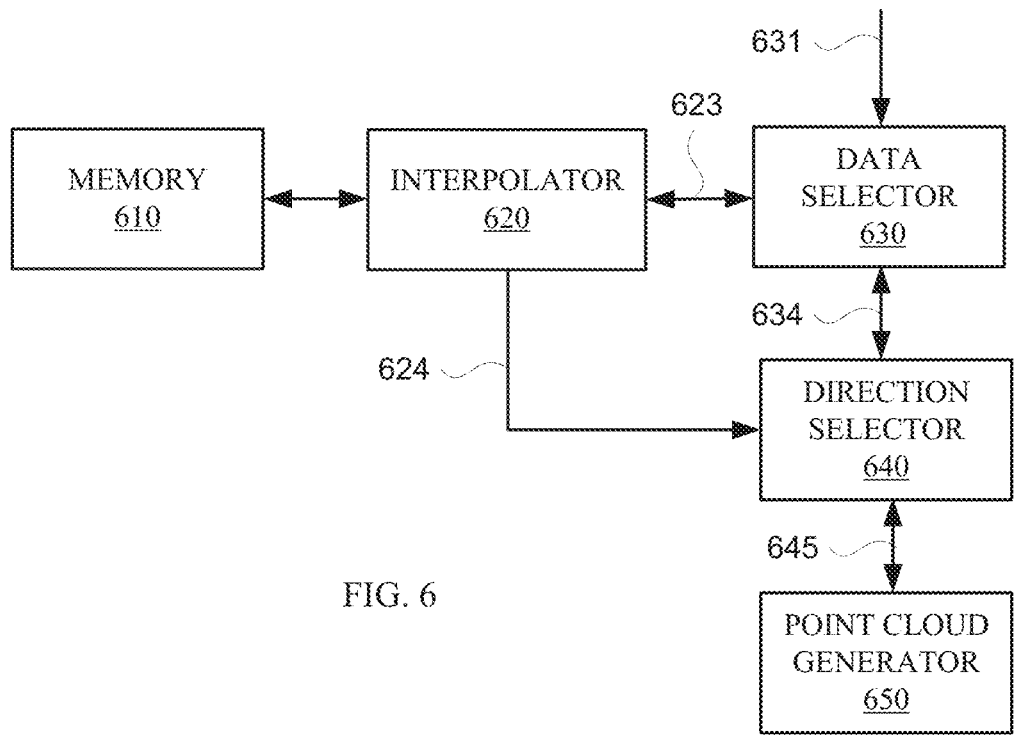
FIG. 6 is an example precision object detector (POD) in an embodiment.

FIG. 6 is an example Precision Object Detector (POD) in an embodiment. The POD 601 is shown comprising memory 610, interpolator 620, data selector 630, direction selector 640 and point cloud generator 650. Each element is described in further detail below.

The memory 610, stores the non-ideality data measured under known/standard conditions. For example, the non-ideality data may comprise, the reference signal information (such as, RF frequency, bandwidth, sweep speed, etc.) that is employed for measuring the non ideality data, the primary angles ($\theta_1$, $\theta_2$, $\theta_3$, ... $\theta_N$, for example) and non ideality angles ($\phi_1$, $\phi_2$, $\phi_3$ ... $\phi_k$, for example). The non ideality data may be stored in digital form as a matrix. For example, when the antenna array is two dimensional, the non ideality angles may be stored as a two dimension matrix.

The interpolator 620 interpolate the non ideality angles to generate an error metrics (interpolated non ideality) corresponding to operating conditions. For example, the interpolator may adjust the non ideality angles $\phi_1$, $\phi_2$, $\phi_3$ ... $\phi_k$ to new set of angles (error metric) $\psi_1$, $\psi_2$, $\psi_3$ ... $\psi_k$, based on at least one of the frequency of operation, bandwidth, etc. In one embodiment, the interpolator may generate new set of angles in proportionate to the frequency of operation.

The data selector 630 receives the range and Doppler data corresponding to each antenna element. The range and Doppler data may comprise peaks representing an object distance and the relative velocity. The data received on path 631 by the data selector 630 corresponds to data on path 367. As may be appreciated, the data on path 367 represents the radar signal received on the antenna array and subjected Fast Fourier Transforms (FFT) by range FFT 350 and subsequently the Doppler FFT 360. Thus, the data on path 631 comprises peaks representing range and velocity.

The data selector 630 performs coherent combining of the data on path 631 and the interpolated non ideality received on path 623. The coherent combining operation increases the signal to noise ratio as the peaks corresponding to spurious objects are reduced. Accordingly, the data selector block may be operated at a threshold value that is lesser than the threshold value set in the conventional radar system. Due to lower threshold level, large number of peaks is provided to the direction selector 640 on path 634.

The direction selector 640 employs the interpolated non idealities received on path 624 to iteratively select the peaks received on path 634. The direction selector 640 is deployed to compare the data received on path 634 with corresponding data on path 624 combined with an estimate of the true direction of detected objects to iteratively reduce the difference to a value less than threshold. In one embodiment, the direction selector 640 employs relation:$Res(k)=\|Y-A_{mi}(k)x\|_2$, in that, Y represents the data received on path 634, $A_{mi}$ represents the data received on the path 624, k is the number of iteration and x is the value determined at every iteration to minimize the residue Res(k). The relation may be iterated as long as the res(k) is greater than pre-defined threshold or may be iterated over a pre-defined number of iterations (k).

As an example the residual value less than 5 percent of Y in general implies that 95 percent of the energy of the incoming signal has been assigned to detected targets. The iterated data with the peaks above a threshold are provided on path 645.

The point cloud generator 650 selects directions that correspond to local peaks data received on the path 645. The peaks are provided as points of the objects, thereby representing an object with larger number of points or with a higher precession.

While various embodiments of the present disclosure have been described above, it should be understood that they have been presented by way of example only, and not limitation. Thus, the breadth and scope of the present disclosure should not be limited by any of the above-discussed embodiments, but should be defined only in accordance with the following claims and their equivalents.

What is claimed is:

1. A method of enhancing resolution of a radar system with a first set of receiving antennas providing an antenna aperture to the radar system, the method comprising:
measuring a first set of radiation patterns of the first set of receiving antennas by feeding a known radio frequency (RF) signal to the first set of receiving antennas, wherein the first set of radiation pattern representing an impairment in the radar system;
receiving on the first set of receiving antennas, a radar signal reflected from an object when the radar system is employed for detecting the object;
coherently combining a second radiation pattern with the radar signal to generate a coherently combined signal, wherein the second radiation pattern is interpolated from the first radiation pattern, the second radiation pattern representing the impairment when the radar system is employed for detecting the object; and
determining a direction of arrival by iteratively reducing difference between the coherently combined signal and the second radiation pattern.

2. The method of claim 1, wherein the impairment is the set of feed lines connecting the first set of receiving antennas to a signal processing electronics in the radar system, the feed lines causing the first set of radiation pattern.

3. The method of claim 2, further comprising translating the first radiation pattern to the second radiation pattern using at least one of a frequency of operation, bandwidth, field of view of the radar system when employed for the object detection.

4. The method of claim 3, wherein the first set of radiation pattern, is represented by a first set of phase angles corresponding to each antenna in the first set of receiving antennas and the second set of radiation pattern, is represented by a second set of phase angles interpolated from the first set of phase angles.

5. The method of claim 4, further comprising, performing first Fast Fourier Transform (FFT) operation on the radar signal received over the first set of receiving antenna when employed for the object detection, to generate a range data and performing a second FFT operation on the range data to generate Doppler data, wherein the first set of phase angles and second set of phase angles corresponds to the range and the Doppler data.

6. The method of claim 5, further comprising, the iteratively reducing difference between the coherently combined signal and the second radiation pattern using a relation: $Res(k)=\|Y-A_{mi}(k)x\|_2$ such that Res(k) successively reduced to zero by iteratively setting the values for x, in that Y represents the coherently combined signal, $A_{mi}$ represents the second radiation pattern, k is a value representing number of iteration and x is a value determined at every iteration to minimize the residue Res(k).

* * * * *